United States Patent [19]

Kreager et al.

[11] Patent Number: 4,534,818
[45] Date of Patent: Aug. 13, 1985

[54] METHOD AND APPARATUS FOR ULTRASONIC SEALING

[75] Inventors: William D. Kreager, Dallas; Kenneth R. Berger, Grapevine, both of Tex.

[73] Assignee: Frito-Lay, Inc., Dallas, Tex.

[21] Appl. No.: 564,754

[22] Filed: Dec. 22, 1983

[51] Int. Cl.³ .................... B29C 27/08; B29D 23/10
[52] U.S. Cl. ...................... 156/466; 53/479;
53/576; 156/494; 156/498; 156/510; 156/515;
156/580.2; 156/581; 493/191; 493/194;
493/203; 493/205; 493/289
[58] Field of Search ............ 156/73.1, 73.3, 203,
156/250, 251, 466, 510, 515, 580.1, 580.2, 494,
498, 581; 53/451, 479, 567, 575, 576; 493/191,
193, 194, 203, 205, 288, 289

[56] References Cited

U.S. PATENT DOCUMENTS

| | | | |
|---|---|---|---|
| 3,306,001 | 2/1967 | Peppler | 53/451 |
| 3,813,998 | 6/1974 | Lotto | 493/191 |
| 4,227,959 | 10/1980 | Brown | 156/580.2 |
| 4,373,982 | 2/1983 | Kreager et al. | 156/203 |
| 4,391,081 | 7/1983 | Kovacs | 53/451 |

Primary Examiner—Michael Wityshyn
Attorney, Agent, or Firm—Bernard, Rothwell & Brown

[57] ABSTRACT

An automatic form-and-fill packaging machine especially adapted for the ultrasonic sealing of food products in flexible bags from ultrasonically sealable flexible packaging material, and a method to utilize said machine. A packaging machine is provided with a first ultrasonic back seal forming unit for producing a continuous longitudinal back seal on the bag, and a second ultrasonic sealing unit provided in a pair of jaw members which are adapted to form the end seals of the bag perpendicular to the direction of travel of the packaging material. The second ultrasonic sealing unit is provided with a horn and an anvil in opposing jaw members, such that when the jaws are shut, the flexible packaging material is tensioned against sealing land areas to provide the end seals.

6 Claims, 3 Drawing Figures

METHOD AND APPARATUS FOR ULTRASONIC SEALING

BACKGROUND OF INVENTION

The present invention relates to novel method and apparatus for making flexible bags, such as flexible bags containing potato chips, corn chips or the like.

The current state-of-the-art in the manufacture of flexible bags from flexible packaging material involves the (a) forming of a sheet of flexible packaging material into a tubular shape, (b) continuously sealing the longitudinal seam to form the sealed tubular member, (c) providing a bottom seal across the entire width of the tubular member, (d) filling the tube with product and (e) providing a top seal across the entire width of the tube to totally enclose the product within the bag. The vast majority of such bags are provided with seals which are induced by the application of heat, either by melting an adhesive specially provided at the seal location or by physically melting the layers of the packaging material to be sealed to one another without the use of adhesives. In either event, sufficient heat must be applied to either melt the adhesive or melt the packaging material, a process that has over the years proved generally satisfactory, but which has been rate-limiting in the production of many packaged food products and which has resulted in manageable but undesirable high rates of failure of the seals produced thereby.

With the advent of new technologies resulting in ever-faster rates of processing of various food products (e.g., potato chips, corn chips, pretzels, cookies, etc.) these technologies have not yet been fully recognized due to the relatively slow sealing rates of currently available packaging machines. One way to take advantage of the higher rates of production is to increase the number of packaging machines, which has to date been generally unacceptable due to the extremely high capital costs required and the space-availability problems related thereto. It has been suggested that the rate of packaging can be increased by simply increasing the heat applied to the seal area, thereby reducing the residence time necessary to effect the heat seal. However, most conventional packaging materials are not capable of withstanding such high temperatures without inducing severe damage to dimensional stability properties of the packaging material as a result.

Seals produced by conventional heat sealing methods are seldom uniform in strength, either from bag to bag or even across the seal on a particular individual bag. It is extremely difficult to maintain uniform temperatures or pressures across the sealing dies or jaws of conventional packaging machines. Uniformity is impeded by the presence of the back seal in the "middle" of the end seal which physically resists equalized pressure or transmission of heat across the seal width. Because most packaging materials contain multiple plies, one of which is generally intended as the sealing ply, the additional plies physically resist or impede uniform transmission of heat throughout the packaging material to be sealed. As a result, most packaging materials contain a relatively expensive sealant layer which would desirably be removed by users of such materials.

SUMMARY OF THE INVENTION

The present invention is especially adapted to provide a flexible bag having all of the seals thereon being provided ultrasonically, as opposed to the more conventional methods of heat, pressure, etc. Because bags which rely upon heat-sealing for forming the bag are relatively expensive (in many cases the packaging materials are more expensive than the products contained therein), any apparatus or process which can materially decrease the cost of the packaging material is highly advantageous. Currently, flexible packaging materials, such as the laminated film products used for the packaging of snack food items such as potato chips, corn chips, cookies, etc., require complex film structures having multiple laminated layers. These film materials generally fall into two categories: those containing a ply, which when mated with a similar ply may be fused together by the application of heat, and those which do not have compatible heat-sealable plies and therefore must have applied thereto a strip of material (e.g., an adhesive) which, when heated, will effect the desired seal. Both of these types of film materials are expensive, because in the first instance an entire ply must be incorporated when only a very small portion (i.e., approximately one-fourth to one-half inch) is to be sealed, and in the second instance, the adhesive structure itself and the processing necessary to incorporate it onto the film material are both quite expensive.

In addition to the problem noted above with packaging films, the manufacture of products in flexible bags which rely upon heat sealing apparatus can be rate-limited by heat transferance. For instance, conventional form and fill packaging machines which utilize heat seals depend upon a residence time of the heat sealing apparatus on the packaging film of approximately one second (a period of time sufficient to permit the transfer of heat through the packaging material to effect the desired seal). Attempts to speed up this process by the seemingly simple expedient of increasing the heat and therefore decreasing the residence time have proved unsuccessful, for both technical (the package film has an upper temperature limit beyond which effective seals may not be consistently produced) and aesthetic (the increased heat causes the seals to "pucker") reasons. A typical sealing time of approximately one second (which is approximately one-half of the two-second cycle for production of, for example, a seven and one-half inch by fifteen-inch flexible package containing eight ounces of product), limits production to a maximum of about 30 bags per minute. Therefore, a packaging technique which is less expensive, faster and produces higher quality seals is much desired by the packaging industry and those companies selling packaged goods.

Applicants have invented a form and fill packaging machine wherein a flexible bag is constructed using solely ultrasonic energy for the provision of seals thereon. A first ultrasonic forming unit provides a continuous longitudinal ultrasonic back seal, the seal being formed in the direction of travel of the flexible packaging material. A second ultrasonic sealing unit is mounted on a pair of jaw members which are operable in an open-and-shut relationship so that when the jaw members are shut, the second ultrasonic sealing unit is actuated and end seals are provided on the flexible packaging material transverse to the direction of travel of said material.

The second ultrasonic sealing unit is provided with an ultrasonic horn and anvil in opposing jaw members, the anvil of one jaw member and the opposing jaw member having cooperating land and valley regions which, when the jaws are shut, crimp and securely hold the flexible packaging material. The land regions of the opposing jaw members extend beyond the center line of the jaw members when shut so that the packaging material is tensioned against sealing land regions of the anvil to prevent movement of the packaging material during actuation of the ultrasonic horn.

Applicant has also found that by directing a stream of coolant (such as any compressed gas, preferably ambient air) against the newly formed back seal, the seal is "tempered" and a stronger, more uniform seal is provided.

DESCRIPTION OF THE PREFERRED EMBODIMENTS

The invention described hereinafter will be described with primary reference to a form and fill packaging machine such as the model 9-18 3V-3 package maker manufactured by Wright Company, however the invention is equally applicable to other packaging machines, such as the Woodman Clipper, Profitmaker, DF-8, the Universal series, and Hayssen Company Ultima packaging machines, and packaging machines manufactured by P. M. C., or other similar packaging machines.

The general mode of operation of these packaging machines involves two sealing steps: after the bag is formed into the tubular configuration by a collar or forming head, a longitudinal back seal is formed, the back seal being formed relatively continuously in the direction of travel of the packaging material; and end seals are being formed transverse to the direction of travel of the packaging material, and perpendicular to the longitudinal back seal. The back seal typically is constructed immediately after the packaging material is formed into its tubular shape, with the end seals, comprising a lower and upper end seal on each individual bag, being formed thereafter. Product is directed through the forming collar into the newly formed bag, and into the bag only after the back and lower end seals have been formed.

End seals are conventionally formed by a pair of moveable jaws, each of which must be activated in an in-and-out motion, to properly form the desired bag. Both jaws must be movable so that when the jaws meet at the end of their in-and-out stroke, they will seal the bag on the center line of the bag and therefore form a symmetrical bag. If only one of the jaws was movable, the seal would not be effected on the center line of the bag, but rather at a lateral edge thereof, and a lop-sided bag would result.

The end seal apparatus is movable in an upward-and-downward arcuate motion; at the top of the arcuate path, the jaws close with the flexible packaging material therebetween and during the downward portion of the cycle, packaging material is pulled from the master roll to form the next succeeding bag. During this downward motion, sealing is effected and product is directed into the formed bag from above. Conventionally, a "stripper" is provided on one of the jaws so that after product has been dispensed in the initial stages of the downward motion of the end seal mechanism, and just prior to the complete closure of the jaws, the stripper mechanism may remove any loose product from the area to be sealed, since such product would adversely affect the quality of the seal to be formed. At the lowermost portion of the downward stroke, a cutting mechanism severs the formed and filled bag from the packaging material.

Figure 1:
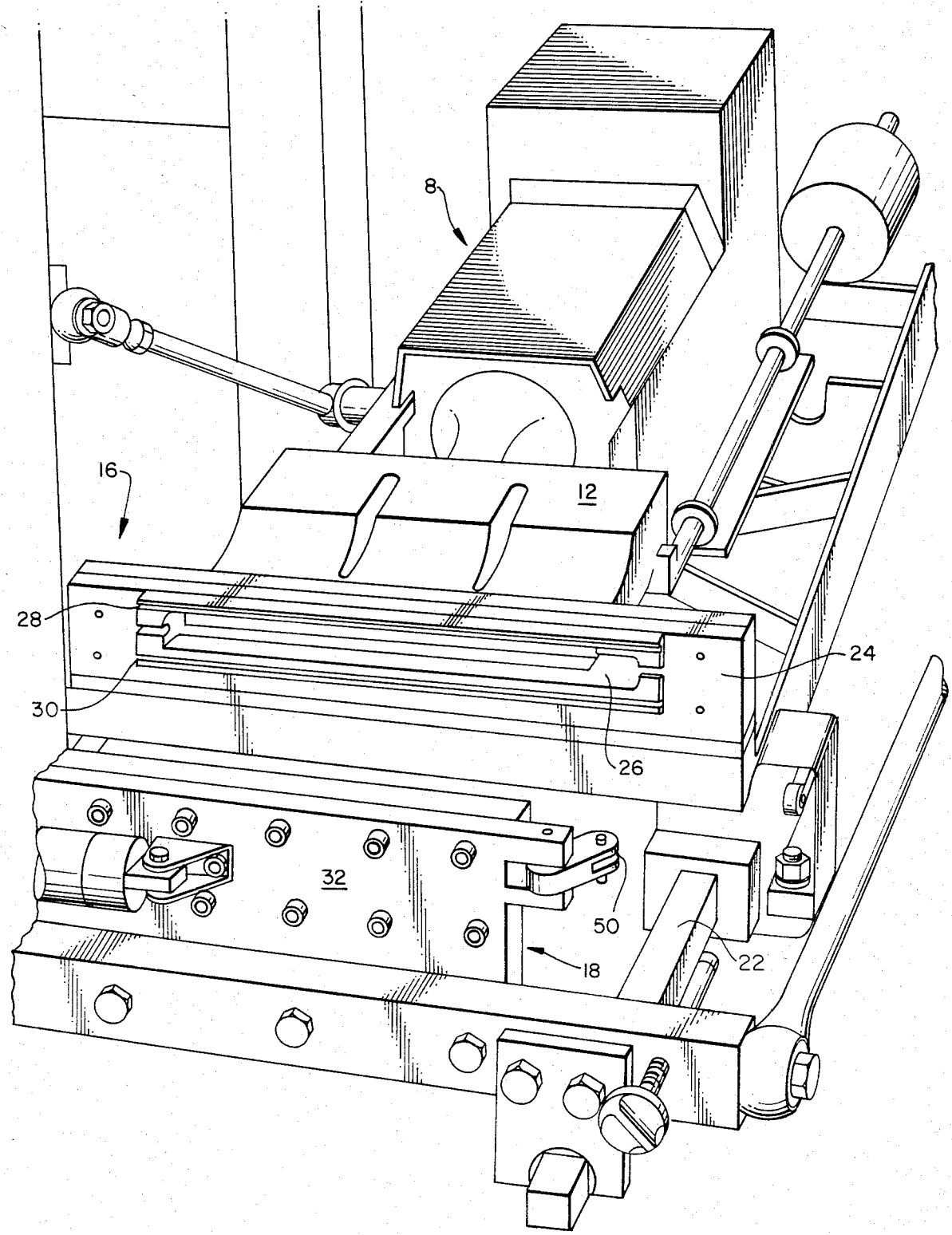
FIG. 1 is a semi-schematic perspective view illustrating a preferred embodiment of the present invention.

Having generally described the environment of the present invention, reference is now made to FIG. 1 wherein a portion of the present invention is disclosed in more detail. In its broadest sense, the present invention embodies a packaging machine having an ultrasonic back seal apparatus similar to that disclosed in U.S. Pat. No. 4,373,982, commonly assigned herewith, and an ultrasonic end seal device disclosed more particularly hereinafter. As shown in FIG. 1, there is provided first ultrasonic unit 8 for generating ultrasonic energy, an ultrasonic horn 12, and an ultrasonic anvil 14. The horn 12 is moveably mounted to a first jaw 16 while the anvil is securely mounted to a second jaw 18, with both jaws being movably fixed to the package machine in an in-and-out relationship. The first and second jaws, 16 and 18, are movably disposed along rail 22.

As shown in FIG. 1, jaws 16 and 18 are in the "open" position as they would appear on the upward portion of the arcuate path(described hereinafter with reference to FIG. 3) after the formed and filled bag has been severed from the package material. For convenience, the packaging material which would normally be disposed between jaws 16 and 18 in FIG. 1 is not shown.

In a conventional form and fill packaging machine, jaws 16 and 18 would be equipped with heat-sealing means which would, when actuated, seal the end seals of the bag by applying heat to the package material. Conversely, the present invention is provided with ultrasonic sealing means in place of the heat sealing apparatus conventionally utilized. The first jaw 16 of the present invention comprises the ultrasonic unit generally designated 8 (comprising a converter and booster) mounting member 24 having provided therein a passageway 26 (through which horn member 12 passes) and a plurality of upper and lower film pulling means 28 and 30, respectively. The second jaw 18 comprises a mounting member 32 upon which the anvil, generally designated 14, is secured, and which as shown in FIG. 2, is provided with a plurality of upper and lower film pulling means, 34 and 36 respectively, and upper and lower land areas, 38 and 40 respectively, which serve as the anvil for horn 12.

Figure 2:
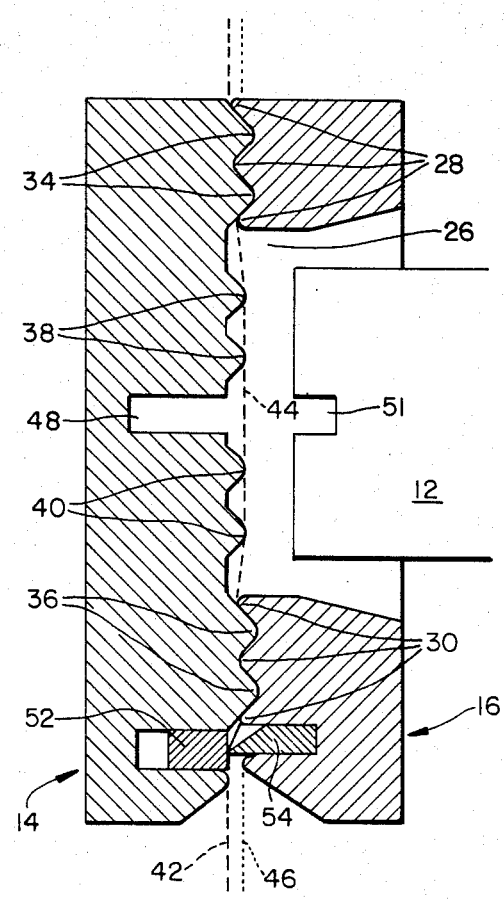
FIG. 2 is a sectional view of the jaws of the present invention when closed with the ultrasonic horn withdrawn.

As shown in FIG. 2, when jaws 16 and 18 are in the closed sealing position, the upper film pulling means 28 of the first jaw cooperate with the upper film pulling means 34 of the second jaw 18 and the lower film pulling means 30, 36 respectively of the first and second jaws cooperate such as that when they are closed with the flexible film material 42 therebetween, that portion of the film material 44 which overlies the upper and lower land areas 38,40 is held securely in place and biased against the land areas 38, 40 to prevent significant lateral or longitudinal movement of the film material. The individual film pulling means (28, 30, 34 and 36) and the land areas 38, 40 each extend past the center line 46 of the jaws when closed, ensuring that the film material 44 is securely biased against the land areas, 38, 40.

The passageway 26 in first jaw 16 is sized to permit passage of horn 12 therethrough. Horn 12 must be movably mounted to permit it to be moved into contact with land areas 38, 40 in order to effect the end seals, while being withdrawn within passageway 26 after the seals have been made.

The second jaw 18 is provided with a slot 48 for cutting means 50, which is mounted to sever the film material between the upper and lower land areas 38, 40. Horn 12 is provided with a slot 51 opposing slot 48 so that the cutting means 50 may be actuated while the horn is still engaged by land areas 38, 40, or in close proximity thereto. Upon engagement of the horn 12 with land areas 38, 40, the seal effected at land areas 38 is the "bottom" seal of the bag to be formed, whereas the seal effected at land areas 40 is the "top" seal of the newly formed bag. Upon the next sealing cycle, land areas 40 provide the top seal of the previously bottom-sealed bag while land areas 38 provide the new bottom seal for the next succeeding bag.

One or both of the jaws may be provided with stripping means, either in the form of a floating stripper 52 or a fixed stripper blade 54, or both. The stripping means serve to remove any residual product from the area to be sealed so that a clean seal may be effected between the layers of film material.

Figure 3:
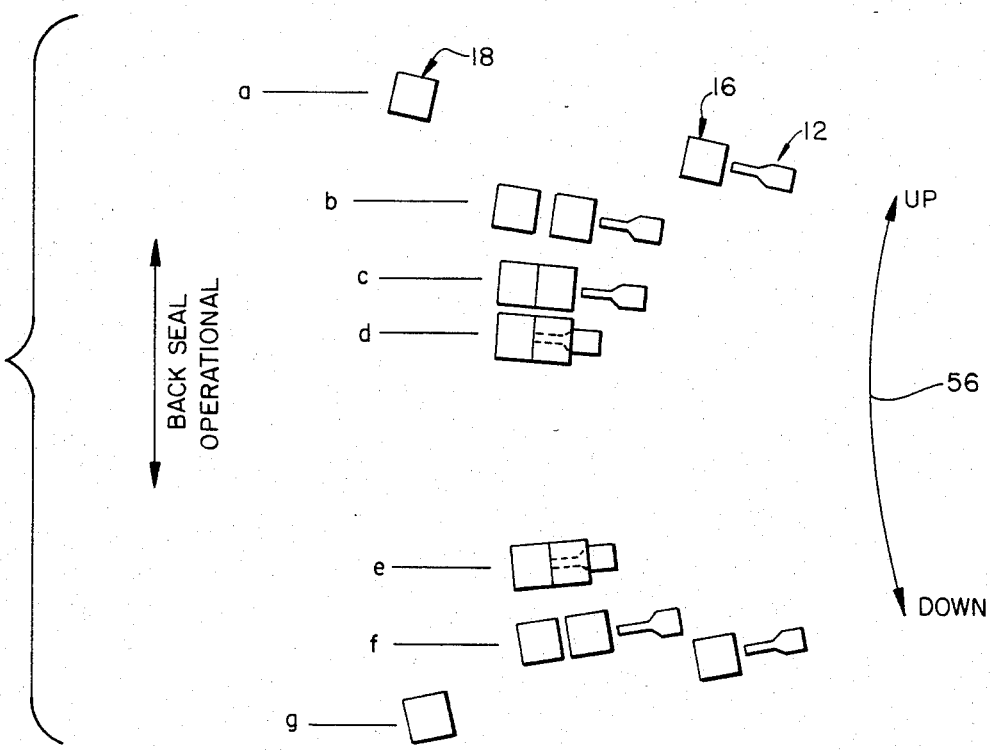
FIG. 3 is a schematic view of a complete cycle of the sealing sequence of the present invention.

The operation of the present invention may be more easily explained with reference to FIG. 3. At the top of the up-and-down arcuate path 56 followed by the jaws, indicated generally as 3a, the jaws are separated and the horn 12 is withdrawn within or through passageway 26 of first jaw 16. (It is to be understood that, while the ultrasonic horn 12 is shown in the figures herein as being withdrawn from the first jaw 16, the horn need only be retracted sufficiently to permit the packaging film to pass between the horn and the land areas 38, 40. Therefore, movement of horn 12 may be as little as one-sixteenth of an inch or as great as two or three inches or more, the specific amount depending upon the individual circumstances of each packaging machine.) When the jaws are open, product is introduced into the bag, which at this point has been provided with a back seal and a bottom seal. The jaws, as shown at 3b, then close to a stripping position wherein the stripping means 52 or 54 are actuated to remove product from between the portions of packaging film 44 to be sealed as the jaws move downwardly on the arcuate path 56. To this point in the cycle, the packaging film has not moved longitudinally. After product has been stripped from the seal area, the jaws continue their downward movement as they are fully closed at the full-closure position (as shown in 3c and in FIG. 2), wherein the packaging film is securely held between the upper and lower film pulling means. At the full-closure position, as shown in 3c and FIG. 2, film is securely held between the upper and lower film pulling means and film is pulled from the master roll as the jaws continue their downward movement. At this point, as the film is moving downwardly, the back seal ultrasonic unit is activated and a back seal is provided on the formed film above jaw members 16 and 18. After the film is secured between the jaws, the horn is moved into sealing position against land areas in the second jaw (FIG. 3d) and the power from the second ultrasonic power unit is activated to effect the end seals. At this point, the cutting means cuts the package material between the land areas 38, 40 (FIG. 3e) to separate the lower filled bag from the upper unfilled package. As the jaws near the lowermost portion of the arcuate path 56 (FIG. 3f), the jaws open and the horn retracts, permitting the filled bag to fall to a take away position therebelow. As the jaws fully open (FIG. 3g), the cycle starts anew and the jaws move upwardly along the same arcuate path, as product once again fills the lowermost bag. It is to be understood that as the jaws are firmly closed about the film, and as they move downwardly to pull film from the master roll (steps 3c–3e), an ultrasonic back seal unit, such as that disclosed in U. S. Pat. No. 4,373,982, is actuated.

The ultrasonic sealing units utilized in the back seal and end seal apparatus herein, are conventional ultrasonic units such as those sold by Branson Sonic Power Company, Sonobond, Inc., or the Dukane Company. A 20kHz actuator with associated booster equipment supplied by Branson Sonic Power Company was found to be acceptable for sealing of various materials. The booster units purchased and used by applicants ranged from 1:1 to 1:2.5 in amplitude gain capability. However, it is anticipated that a substantially broader range of amplitude gain capability can be used in the practice of this invention. A suitable horn had a uniform output across its entire width with the face of the horn having a milled slot 51 as shown in FIG. 2. The flexible packaging materials utilized in the present invention may be any material susceptible to ultrasonic sealing, which may be conventional materials or materials especially adapted to be sealed ultrasonically. Generally speaking, packaging materials to be sealed by the apparatus and method of the present invention should be somewhat less expensive than materials sealed by application of heat, since such heat-sensitive materials must usually be specially manufactured. It has been found that, by way of example only, packaging materials made of low density polyethylene, ethylene vinyl acetate or ionomer resins as the sealant are suitable materials for use herein. The other plies are relatively unimportant, or do not interfere with adequate seal-making.

It has been found that an improved ultrasonic seal may be made if the seal is "tempered" by directing a burst or jet of air over the newly formed seal. It is believed that tempering of ultrasonically formed seals on flexible packaging materials increases the strenth of the seal much in the same manner that the tempering of newly formed steel increases the strength of the steel. The more rapid cooling of the ultrasonically bonded area sets the seal more quickly and uniformly, and it thus is less susceptible to irregularities which may be induced during slow cooling. While ambient air is the most convenient tempering gas, any other suitable gaseous or liquid medium may be utilized. It is believed that the tempering of ultrasonic seals in a packaging environment will have more applicability in the formation of back seals than in the formation of end seals because the back seal is not held under compression while cooling takes place, as is the case with the end seals produced hereby.

By way of example, a typical potato chip bag containing eight ounces of chip product would have dimensions of approximately seven and one-half inches in width by fifteen inches in length. Conventional bag making machines such as the Wright Model 918 are capable of producing bags of this dimension at the rate of approximately 25–30 bags per minute. Therefore, assuming a rate of 30 bags per minute, the total cycle as shown in FIG. 3 requires approximately two seconds, and further assuming that the downward portion of the cycle is roughly equal in time to the upward portion of the cycle, the sealing portion of this operation on a conventional heat sealing apparatus takes approximately one second. Applicant has found that high quality seals may be obtained on appropriate packaging material run on such a bag making machine, with the application of power to an ultrasonic horn for from 0.1 to about 0.3 seconds, and preferably for approximately 0.15 seconds. Therefore, such a machine utilizing the method and apparatus of the present invention could produce packages at a rate of approximately three to five times greater than the prior-art processes.

Bags produced by applicant according to the present invention may not only be produced at a greater rate but also with better seal quality than conventional heat-sealed packages.

TABLE 1

Comparison of Seal Quality in Conventional and Ultrasonically-Sealed Packages

| Strength Tests | Conventional (heat) | Ultrasonic |
|---|---|---|
| Instron (grams per 1″ width) | 450 | 1600 |
| Air burst tests (PSI) | 1.5 | 3.5 |
| Durability tests (drop from 4′) | 94% pass | >99% pass |

While the invention has been described herein in connection with its use in the packaging of food items (particularly snack food items) it will be apparent to those skilled in the art that the invention could be used for a variety of other sealing applications wherein flexible packaging material is utilized.

We claim:

1. An apparatus for sealing flexible packaging material on a form and fill packaging machine to produce flexible bags having ultrasonically sealed end seals, comprising:
   a. cooperating land and valley regions provided on a portion of first and second movable members;
   b. a plurality of first land regions comprising an anvil on said first movable member, said first land regions extending beyond a centerline of said first and second members when closed;
   c. said first land regions interacting with a plurality of second land regions on said second member, said second land regions extending beyond said centerline;
   d. said first and second land regions cooperating such that packaging material is biased against said anvil when said first and second movable members are closed; and
   e. said second movable member provided with an ultrasonic horn which effects an ultrasonic seal at the location of said anvil when the packaging material is biased thereagainst.

2. The apparatus as recited in claim 1, wherein mechanical cutting means are provided on one of said members, said cutting means being actuated to sever a sealed bag from said flexible packaging material.

3. The apparatus as recited in claim 1, wherein stripping means are provided to remove from the region to be sealed product to be enclosed within said bag.

4. An apparatus for sealing flexible packaging material on a form and fill packaging machine to produce flexible bags having ultrasonically sealed end seals, comprising:
   a. cooperating land and valley regions provided on a portion of first and second movable members;
   b. a plurality of first land regions comprising an anvil on said first movable member, said first land regions extending beyond a centerline of said first and second members when closed;
   c. said first land regions interacting with a plurality of second land regions on said second member, said second land regions extending beyond said centerline;
   d. said first and second land regions cooperating such that packaging material is biased against said anvil when said first and second movable members are closed;
   e. said second movable member provided with an ultrasonic horn which effects an ultrasonic seal at the location of said anvil when the packaging material is biased thereagainst; and
   f. an ultrasonic back seal forming device for making continuous longitudinal ultrasonic back seals, said back seal being sealed in the direction of travel of said packaging material.

5. The apparatus as recited in claim 4 wherein the ultrasonic back seal forming device is provided with a seal-tempering device comprising an air jet directed upon a newly formed ultrasonic back seal.

6. An apparatus for sealing flexible packaging material on a form and fill packaging machine to produce flexible bags having ultransonically sealed end seals, comprising:
   a. cooperating land and valley regions provided on a portion of first and second movable members;
   b. a plurality of first land regions comprising an anvil on said first movable member, said first land regions extending beyond a centerline of said first and second members when closed;
   c. said first land regions interacting with a plurality of second land regions on said second member, said second land regions extending beyond said centerline;
   d. said first and second land regions cooperating such that packaging material is biased against said anvil when said first and second movable members are closed;
   e. said second movable member provided with an ultrasonic horn which effects an ultrasonic seal at the location of said anvil when the packaging material is biased thereagainst; and
   f. mechanical cutting means provided on said first movable member to sever a sealed bag from said flexible packaging material.

* * * * *